United States Patent
Yin et al.

(10) Patent No.: US 9,176,004 B2
(45) Date of Patent: Nov. 3, 2015

(54) IMAGING SENSOR ARRAY TESTING EQUIPMENT

(71) Applicant: Apple Inc., Cupertino, CA (US)

(72) Inventors: Ye Yin, Sunyvale, CA (US); Julia C. Davoud, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 13/631,444

(22) Filed: Sep. 28, 2012

(65) Prior Publication Data

US 2013/0242290 A1    Sep. 19, 2013

Related U.S. Application Data

(60) Provisional application No. 61/612,054, filed on Mar. 16, 2012.

(51) Int. Cl.
| | | |
|---|---|---|
| *G01J 1/02* | (2006.01) | |
| *G01J 1/42* | (2006.01) | |
| *G01J 3/50* | (2006.01) | |
| *G09G 3/00* | (2006.01) | |

(52) U.S. Cl.
CPC .............. *G01J 1/0271* (2013.01); *G01J 3/506* (2013.01); *G09G 3/006* (2013.01); *G01J 2001/4247* (2013.01); *G09G 2320/029* (2013.01); *G09G 2320/0693* (2013.01); *G09G 2360/14* (2013.01)

(58) Field of Classification Search
None
See application file for complete search history.

(56) References Cited

U.S. PATENT DOCUMENTS

| | | | | |
|---|---|---|---|---|
| 5,754,678 | A * | 5/1998 | Hawthorne et al. | 382/149 |
| 6,847,428 | B1 | 1/2005 | Sekiguchi et al. | |
| 2006/0049768 | A1* | 3/2006 | Yang et al. | 315/150 |
| 2006/0280360 | A1* | 12/2006 | Holub | 382/162 |
| 2007/0024576 | A1* | 2/2007 | Hassan | 345/156 |
| 2009/0262341 | A1* | 10/2009 | Konopa et al. | 356/239.2 |
| 2011/0199395 | A1* | 8/2011 | Nathan et al. | 345/690 |

FOREIGN PATENT DOCUMENTS

| | | |
|---|---|---|
| CN | 1357115 A | 7/2002 |
| CN | 1782725 A | 6/2006 |
| CN | 101685040 A | 3/2010 |
| CN | 202126546 | 1/2012 |
| CN | 101288112 | 3/2012 |
| TW | 201211445 A | 3/2012 |
| WO | 2005069259 | 7/2005 |
| WO | 2007042774 | 4/2007 |
| WO | WO 2011/026269 A1 | 3/2011 |

OTHER PUBLICATIONS

Taiwanese Office Action dated Sep. 26, 2014, TW 102109352, 16 pages.

* cited by examiner

*Primary Examiner* — Gordon J Stock, Jr.
(74) *Attorney, Agent, or Firm* — Joseph F. Guihan

(57) ABSTRACT

A testing device for testing one more characteristics of an electronic display. The testing device includes a main body and a receiving cavity defined within the main body configured to receive at least a portion of the electronic display. The testing device also includes a plurality of sensors positioned on a first surface of the testing device and configured to be in optical communication with at least a portion of the electronic display received within the cavity. The plurality of sensors is configured to detect at least one type of non-uniformity of the electronic display by detecting light emitted from the electronic display.

19 Claims, 13 Drawing Sheets

# IMAGING SENSOR ARRAY TESTING EQUIPMENT

CROSS REFERENCE TO RELATED APPLICATIONS

This application claims the benefit of priority pursuant to 35 U.S.C. §119(e) of U.S. provisional application No. 61/612,054 filed 16 Mar. 2012 entitled "Imaging Sensor Array Testing Equipment," which is hereby incorporated herein by reference in its entirety.

TECHNICAL FIELD

This application relates generally to display devices, and more particularly to equipment for testing display devices.

BACKGROUND

Electronic displays, such as those used with or incorporated into electronic devices, have a variety of different optical parameters that may determine or affect the quality and/or appearance of images displayed on these displays. For example, the contrast, white luminance, uniformity of light, gamma, and/or color gamut of a display may alter the appearance of images on these displays. Also, electronic displays may be subject to visual artifacts, such as light leakage, flicker, ripple, dot or line defects, and so on. These artifacts may impact the quality of a user's experience while viewing electronic displays. Generally, artifacts may be parameter-based and thus generally static (such as light leakage), or artifact-based and thus generally dynamic (such as flicker).

In some instances it may be beneficial to test electronic displays during manufacturing in order to correct the parameters, reduce or eliminate artifacts, and/or to prevent defective displays from being shipped or otherwise provided to consumers. However, current testing equipment and methods typically provide either parameter-based testing or artifact-based testing. Both artifact testing and parameter testing typically must be used so that both types of defects may be tested for, thereby requiring two separate sets of test for each display panel.

Further, some current tests for optical parameters and/or artifacts may be very accurate, but may be labor intensive, require expensive equipment, or may only test a particular pixel or group of pixels at a time. Such tests may not be scalable to test manufacturing lines of electronic displays in a time or cost efficient manner.

SUMMARY

Generally, embodiments described herein may take the form of a testing device for testing one more characteristics of an electronic display. The testing device includes a main body and a receiving cavity defined within the main body configured to receive at least a portion of the electronic display. The testing device also includes a plurality of sensors positioned on a first surface of the testing device and configured to be in optical communication with at least a portion of the electronic display received within the cavity. The plurality of sensors is configured to detect at least one type of non-uniformity of the electronic display by detecting light emitted from the electronic display.

Another embodiment may take the form of a method for detecting one or more non-uniformities in an electronic display. The method includes providing a testing device having one or more sensors and collecting, by the one or more sensors, light data corresponding to light emitted from the electronic display over a time period.

Yet another embodiment may take the form of a testing apparatus for detecting two or more characteristics of a display for a computing device. The testing apparatus includes a main body, a receiving cavity defined within the main body and configured to receive at least a portion of the display, a first group of sensors positioned on a first surface and configured to be in optical communication with a first portion of the display received within the receiving cavity, and a second group of sensors positioned on the first surface and spatially separated from the first group of sensors, the second group of sensors configured to be in optical communication with a second portion of the display received within the cavity. The first and second groups of sensors are configured to detect at least one type of non-uniformity of the display.

Other embodiments and advantages will be apparent upon reading the detailed description.

DETAILED DESCRIPTION

Figure 1:
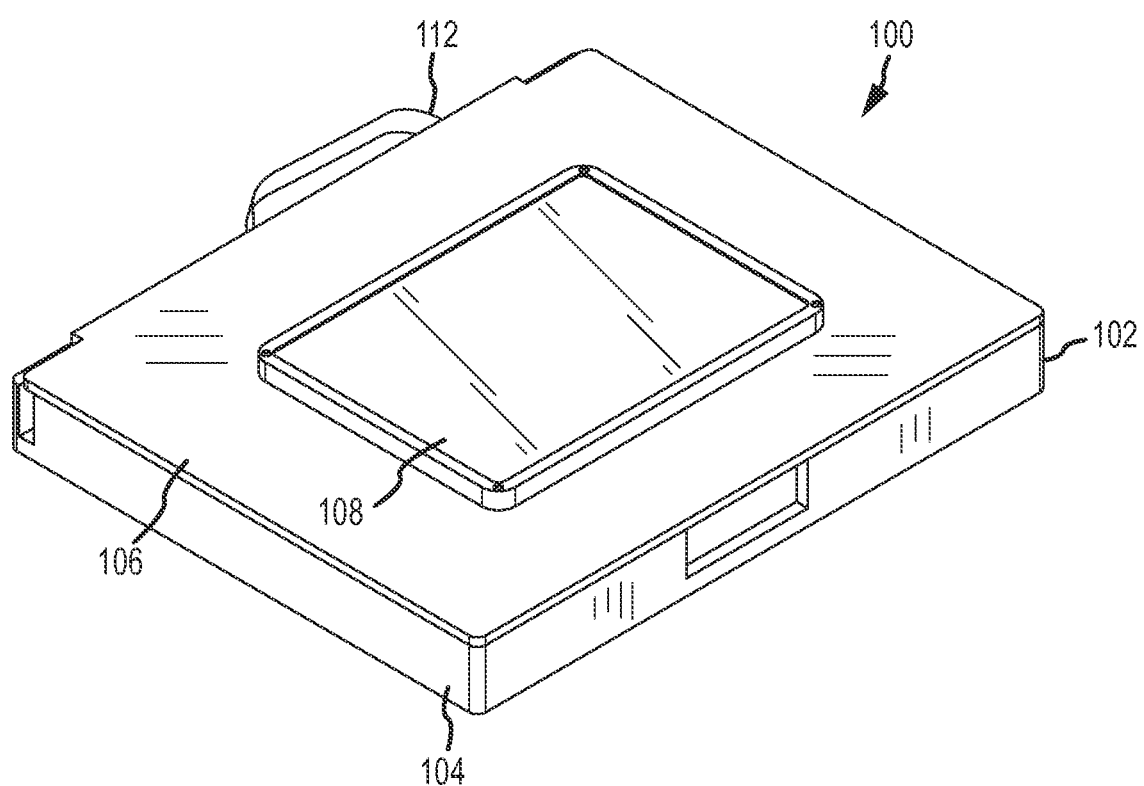
FIG. 1 is a top perspective view of a sample testing device for detecting one or more non-uniformities in a display.

Generally, embodiments described herein may take the form of devices and methods for testing one or more aspects of an electronic display, such as a liquid crystal display (LCD), light emitting diode (LED) screen, or a plasma display. The devices and methods described herein may be used with substantially any type of electronic display that may emit one or more images using one or more light sources and may be used to detect one or more non-uniformities of a display. As briefly described in the background, electronic displays may have one or more non-uniformities or undesired characteristics, some of these non-uniformities may be correctable if detected, others may not be correctable and cause a display to be undesirable for consumer use or sale. Current testing devices for displays typically may only test a display for a one of a variance in an optical characteristic, a static artifact, or a dynamic artifact, each defined in more detail below. Further, many testing devices may be labor intensive and/or may require expensive equipment and thus may not be easily or efficiently adapted to commercial production of display devices.

As defined herein, a non-uniformity or non-uniform characteristic for a display screen is meant to encompass substantially any type of variation in a characteristic either spatially, temporally, or as compared with substantially similar displays. For example, non-uniformities may encompass variances or errors in optical characteristics or parameters and/or may include artifacts or anomalies during a visual representation an image, examples of which are discussed in more detail below.

In one embodiment of the present disclosure, a testing device may be used to measure display characteristics and their variances from an accepted or desired set of values. These display characteristics may include one or more optical parameters that may vary from a desired value. The testing device may also test for the presence of one or more display artifacts, both static artifacts and dynamic. The testing device may include a main body defining a receiving cavity configured to receive an electronic display or a portion thereof. Some embodiments of the testing device may include a cover or other member that may be used to prevent external light from entering the cavity while the display is being tested. In yet other embodiments, the testing device may be a relatively flat surface and a display may be positioned on top of the surface, or may snap fit onto the surface, or the testing device may slide onto or otherwise operably connect to the display. In these embodiments, the testing device may not include a cavity and/or cover. Additionally, the testing device may include one or more light sensors, such as phototransistors, that may be used to measure various characteristics of the display. The sensors may be arranged within the cavity to capture light emitted from portions or substantially the entire display.

Data may be collected from the plurality of sensors and analyzed to determine various characteristics of the electronic display. For example, the input signal for a particular sensor may be analyzed to determine if the light emitted from a particular area of the display is at the desired level. As another example, the input signal of the sensor over a time period of display activation, changes or differences in certain areas of the display relative to others (such as brighter areas, different colors based on wavelength), and so on may be analyzed to determine the characteristics of the display. In some embodiments, each of the plurality of sensors may be a photosensor, such as a spectrally suited phototransistor, with a luminosity curve generally peaking at a wavelength in the electromagnetic spectrum visually perceptible to humans (e.g., having a wavelength ranging from about 390 to 750 nanometers), or having a detection curve generally matching the human visual spectrum. In these embodiments, the plurality of sensors may be able to more accurately detect non-uniformities within the display that may be perceptible to a human.

In another embodiment of the present disclosure, a method for testing may detect one or more non-uniformities of the electronic display. In the method, the display or a portion thereof may be positioned within the receiving cavity and activated for a period of time. As the display is activated it may emit light, creating one or more images or other visual outputs on the display. While the display activated, the sensors may produce signals correlating to the emitted light of the display. It should be noted that in other embodiments, during testing the activation of the display may include only activating a backlight for the display screen and thus the display may not be configured to emit images, but only a background light. The signals or data from the sensors may then be correlated to determine dynamic and/or static characteristics of the display. For example, because the desired color, brightness and other characteristics of a known image also may be known, the values at a particular sensor may be compared with corresponding known values or the values of other sensors to determine if the portion of the display monitored by the sensor is performing within tolerances. In some embodiments, the sensors may only output data when there is a change in the display output. For example, the sensors may be configured to provide an input signal only if light encountering the sensors exceeds a predetermined value. In this manner, the sensors may only register a signal if there is a non-uniformity in the display, such as an increased brightness or luminance as compared to other substantially similar displays.

Similarly, adjacent sensors or sensors corresponding to a particular area of the display may be compared against other sensors to detect non-uniformities of the display. For example, if the display has light leakage at an intersection of a screen and an enclosure, the sensors corresponding to that portion of the perimeter may have an increased signal or value compared to those sensors measuring a light output of an internal portion of the screen. Similarly, the display may be activated for a period of time within the testing device so that the sensors may collect data for the display over the time period. Output characteristics of the display collected by the sensors over the time period may then be used to determine if the display generates dynamic artifacts. For example, to detect a flicker in the display, the display may be configured to emit a relatively constant image over the time period, and data may be collected from a sensor or group of sensors over the time period. If the sensor or group of sensors detects changes or variances in the display output (e.g., the input signal for the sensors varies over time) despite the relatively constant desired emitted image, the display may have a flicker or other dynamic artifact.

As briefly discussed, the testing device and testing methods disclosed herein may be able to detect one or more non-uniformities for a particular display or group of displays. For example, some optical characteristics which may be unequal across portions of the display or non-uniform as compared to substantially similar displays and thus may be considered to be non-uniformities and that may be detectable by the testing device include variations (either with respect to a particular display or with respect to two displays compared to each other) in luminance, contrast, gamma, or color gamut. It should be noted that these type of non-uniformities may be static in that they may be relatively constant over a time period or they may be dynamic and may change over the time period. Luminance is a photometric measure of the luminous intensity per unit area of light traveling in a given direction. With respect to electronic displays, a luminance characteristic may describe the amount of light which is emitted from the display or a portion thereof. In other words, luminance determines how bright the display may appear to a user. Contrast for a display may be defined as differences in color and/or luminance across different portions of an image emitted by the display. Gamma, with respect to electronic displays, may be defined as a function or processing of image or display signals in order to approximate a gamma or power function of human vision. Color gamut may be defined as a range of colors that may be output by the display or that may be desired to be output by the display. White point generally refers to the hue of white emitted from a display.

Additionally, the testing device may also be used to detect other types of non-uniform artifacts including those that are static and may not change over time or may be dynamic and change over time or may be more visible over a time period. Examples of static artifacts may include on-axis artifacts such as light leakage, mura, dot defects, and/or line defects, as well as off-axis (e.g., random or non-linear) artifacts such hot spots, dirt or other debris, and/or display defect such as defects in a LED or LCD.

Light leakage generally refers to light from the display that is unintentionally viewable by a user. Light leakage may be caused by mechanical pressure being applied to the display and creating a light path. The pressure may be caused by external pressure, internal thermal expansion, or a non-uniformity in the material itself, among other possible causes. Mura, which may be an on-axis or an off-axis artifact, may be defined as a low-contrast irregular pattern or region that may color (typically yellow or white), cloud, or cause dark spots or patches in the affected areas of the screen. For example, mura may cause yellow or white stripes along the display. Dot and line defects may be caused my one or more pixels that may be dead, stuck on, or otherwise not emitting the correct wavelengths of light. Similarly, hot spots may be caused when one or more pixels may be defective and may emit only white light wavelengths.

Figure 2:
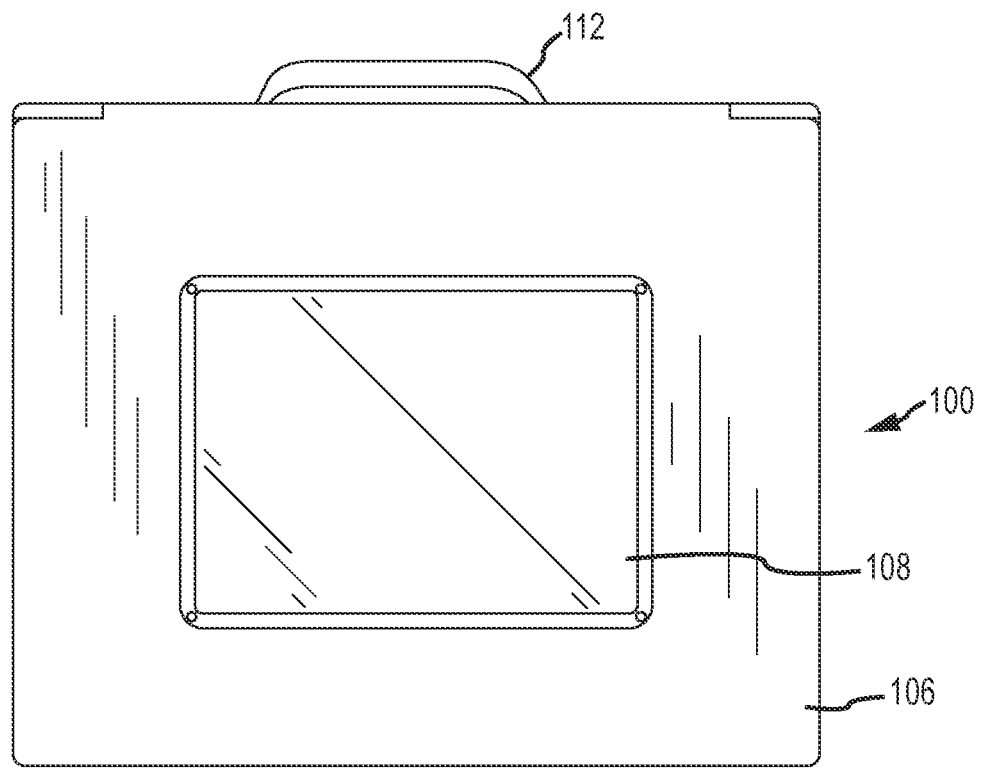
FIG. 2 is a top plan view of the testing device of FIG. 1.

Turning now to the figures, FIG. 1 is a top perspective view of a testing device 100 that may be used to test an electronic display, and FIG. 2 is a top plan view of the testing device 100 of FIG. 1. The testing device 100 may be configured to receive one more electronic displays, and as such the size and/or shape of the testing device 100 may be varied based on the configuration of the electronic display to be tested. Further, in some instances it may be desirable to test two or more displays substantially simultaneously. In these instances, the testing device 100 may be configured to receive multiple displays.

The testing device 100 may include a main body 102 or enclosure that may receive the display. In some embodiments, the main body 102 may be a dark or light-impermeable material or may include a coating or enclosure that may be a dark or substantially light-impermeable material. For example, the main body 102 may be a dark and relatively dense plastic or the like. In these embodiments, while a display is received within the main body 102, external light may be substantially prevented from entering the main body 102, as light passing into the main body may affect data collected by the testing device 100. Additionally or alternatively, the main body 102 may include a light absorptive or reflective coating.

Figure 3:
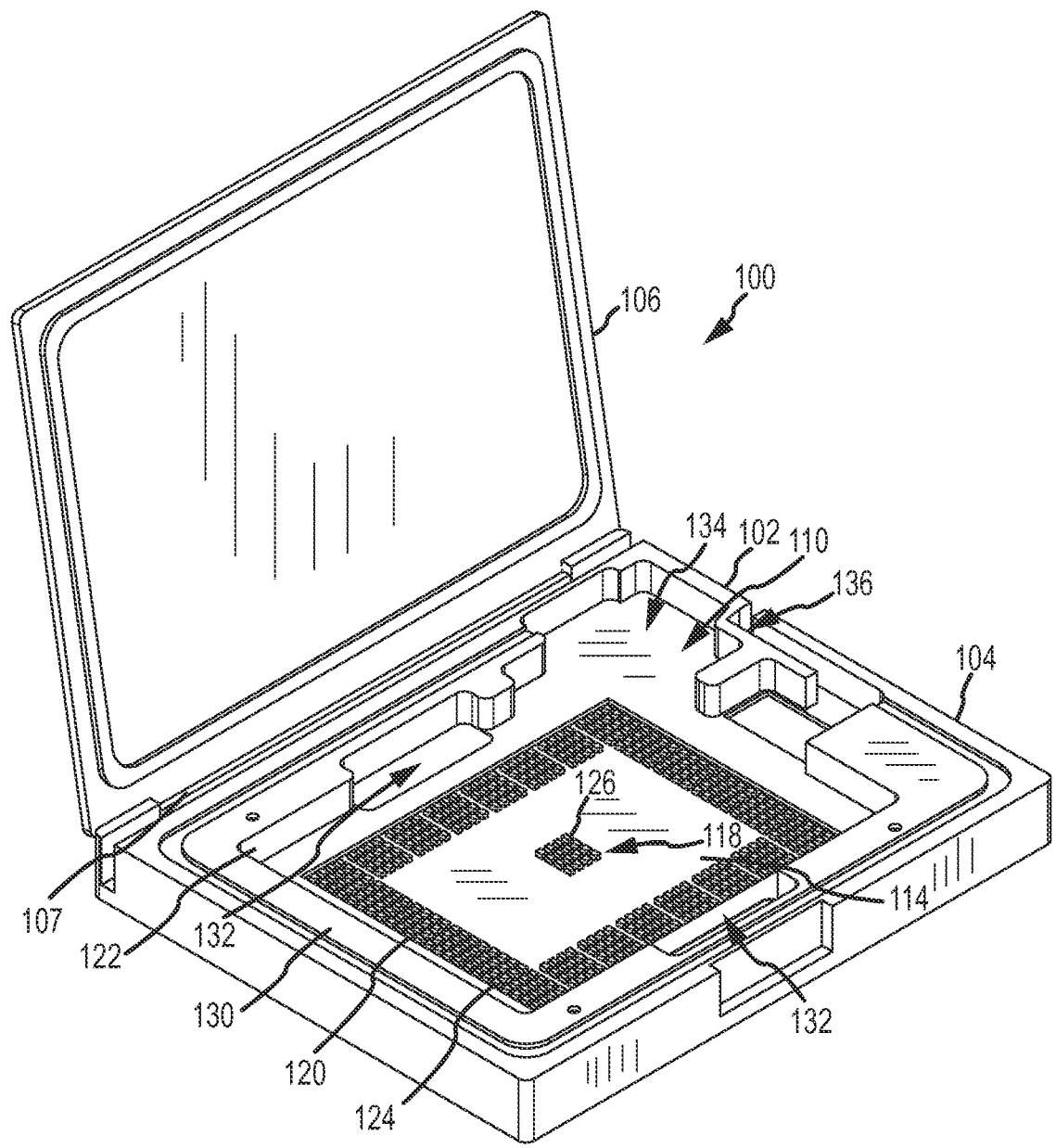
FIG. 3 is a side perspective view of the testing device of FIG. 1 with a cover in an open position.

The main body 102 may be a substantially integral member, or as shown in FIG. 1, may include a bottom or lower portion 104 and a cover or upper portion 106. FIG. 3 is a side perspective view of the testing device 100. As shown in FIG. 3, the cover 106 may be rotatably connected to the bottom 104 by a hinge 107 or other connection mechanism, so that the cover 106 may rotate away from the bottom 104 to provide access to a receiving cavity 110. In embodiments where the main body 102 may be a substantially integral member, the cover 106 may be omitted or may be integrally formed with the bottom 104. In these embodiments, the receiving cavity 110 may be accessible by one more apertures (not shown).

In some embodiments, the testing device 100 may include a communication mechanism, such as communication cable 112. In these embodiments, the testing device 100 may be in communication with one more computing devices (not shown), either wirelessly (e.g., WiFi, Ethernet, Bluetooth, etc.) or by the communication cable 112 or a port (see FIG. 6B). Alternatively or additionally, with reference again to FIGS. 1 and 2, the testing device 100 may include an output or indication mechanism 108. The output mechanism 108 may be a display, light, or other indication mechanism that may provide output to a user regarding the testing of a particular display. As one example, the output mechanism 108 may be a grid of lights, such as LEDs, that may illuminate to indicate a non-uniformity in a particular location of the display. In this example, each LED may be positioned to approximately correlate with a unique location of a sensor within the cavity 110. As another example, the output mechanism 108 may be a display screen and the testing device 100 may include a processor and/or communication mechanism that may provide a more detailed analysis and/or a graphical user interface (GUI). In these examples, the testing device 100 may collect data from a tested display as well as analyze and/or display data. In other examples, the testing device 100 may communicate the data to one or more computing devices which may then analyze and/or present the data.

Figure 4:
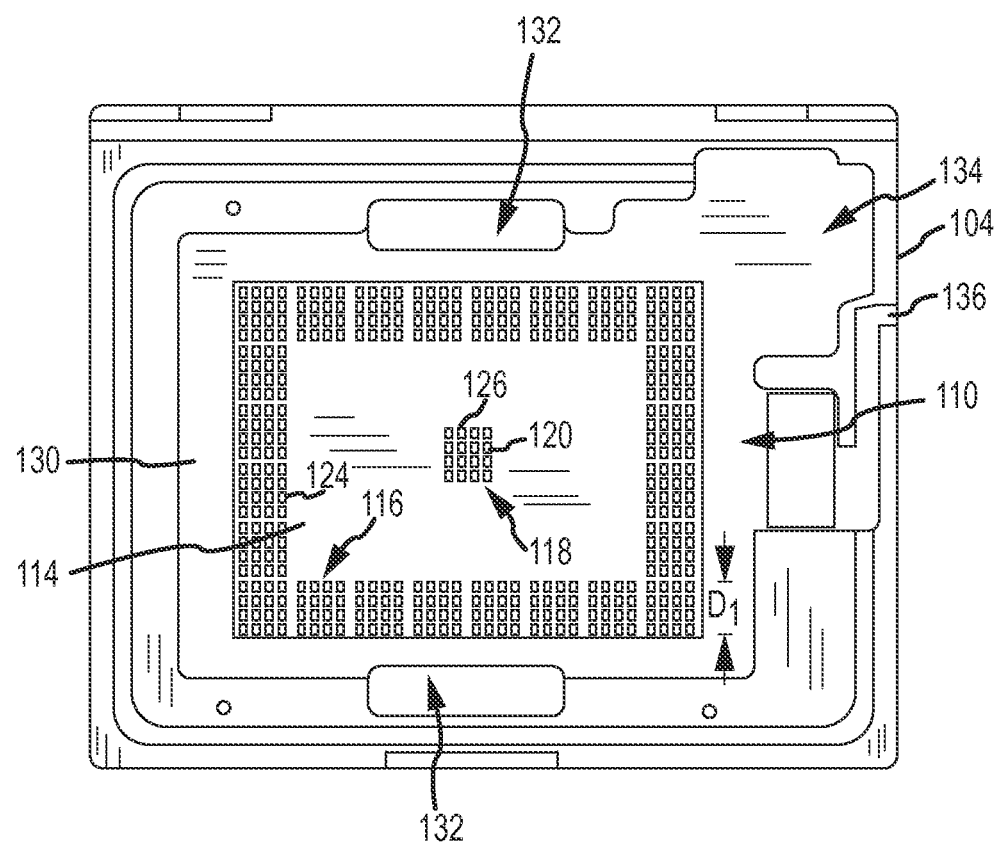
FIG. 4 is a top plan view of the testing device of FIG. 1 with the cover in the open position.
Figure 8A:
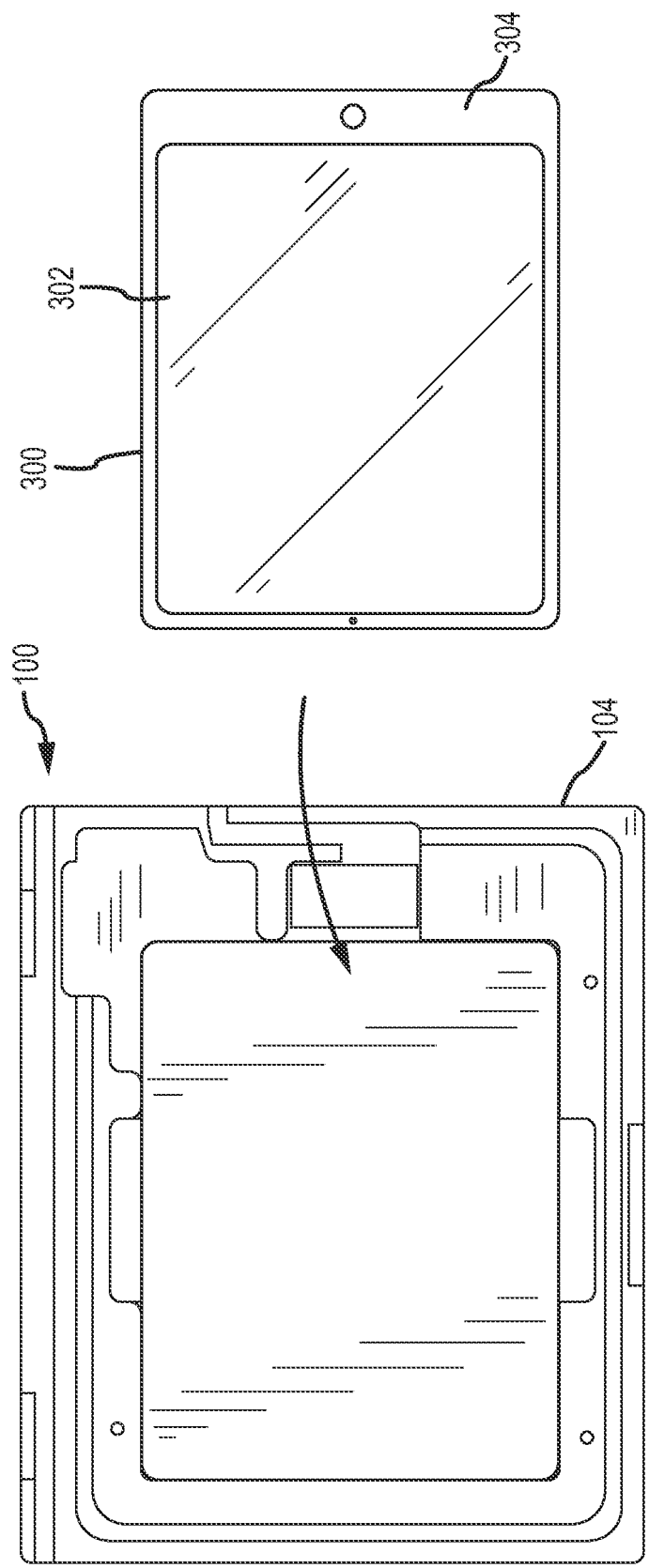
FIG. 8A is a front perspective view of an electronic display being received into the testing device of FIG. 1.
Figure 8B:
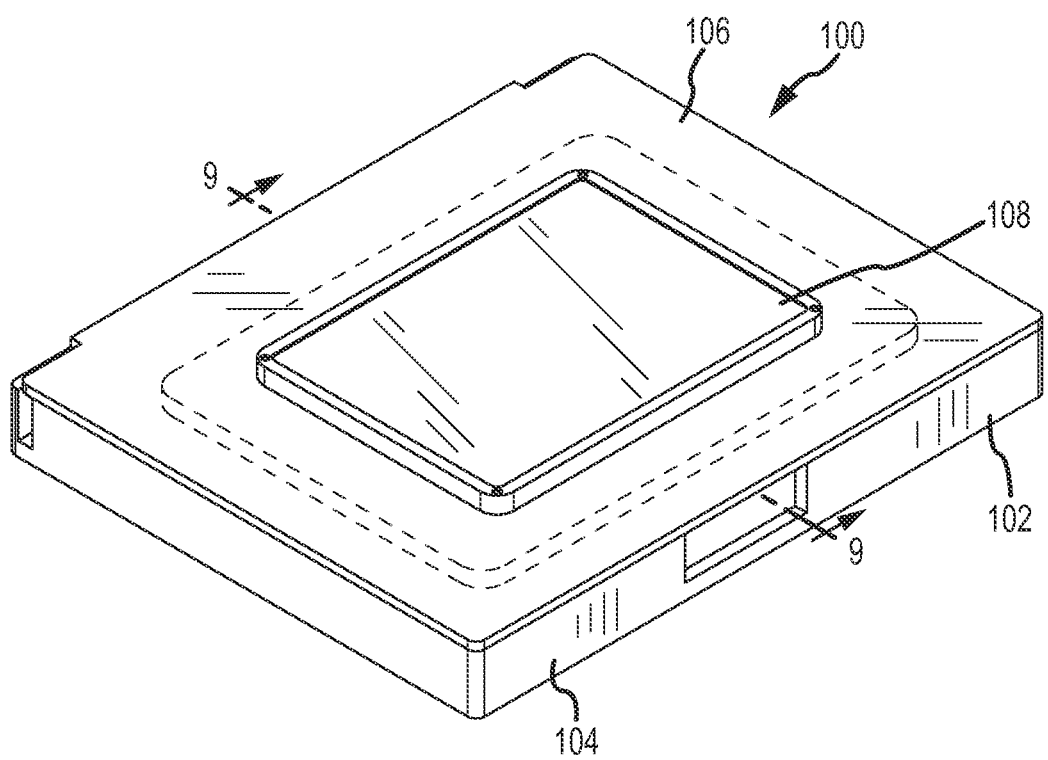
FIG. 8B is a front perspective view of the electronic display received into the testing device of FIG. 1 with the cover closed.
Figure 9:
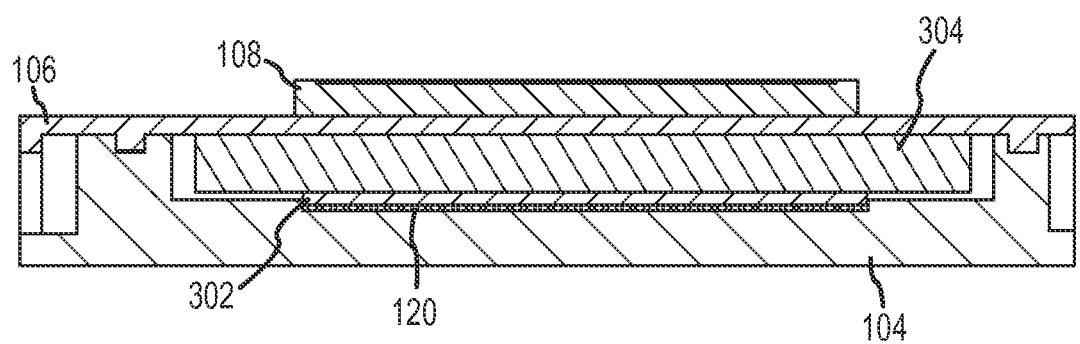
FIG. 9 is a cross-sectional view of the testing device having the electronic display received therein.

A display to be tested by the testing device 100 may be positioned within the cavity 110 (as shown in FIGS. 8A-9). FIG. 4 is a top plan view of the testing device 100 with the cover 106. The testing surface 114 may be substantially any type of surface that may support and provide a communication mechanism for one or more sensors. For example, the testing surface 114 may be a printed circuit board, a substrate, a surface made from plastic, metal or another suitable material, and so on. Additionally, it should be noted that the testing surface 114 may not provide the communication mechanism itself but may provide an aperture for the one or more sensors to connect to a communication mechanism. However, in many embodiments, the testing surface 114 itself may provide a communication mechanism such as one more electronic pathways (e.g., conductive traces, flexible circuits, fiber optics and the like) so that the one or more sensors may be electronically communicate with a processor and/or memory component.

In some embodiments, the testing surface 114 may form the main body 102 of the testing device 100. For example, the testing device 100 may be a generally planar surface such as a sheet and a display may be positioned on top of a portion of the surface 114 and tested. In these embodiments, the cover 106 and/or other portions of the testing device 100 may be omitted.

In some embodiments, the testing surface 114 may be operably connected to the bottom portion 104 of the testing device 100; however, in other embodiments, the testing surface 114 may be positioned on the cover portion 106 or both portions. The testing device 100 may be configured so that the display to be tested may be received into the receiving cavity 110 such that a light emitting side of the display may face towards the testing surface 114.

The testing surface 114 may support one or more of the sensors 120 to capture light from the tested display. As shown in FIG. 4, the testing surface 114 may be generally rectangular, but in alternative embodiments the surface may be have substantially any shape. In some embodiments, the testing surface 114 generally may correspond to the size and shape of the display or portion of the display configured to emit light. Thus, the testing surface 114 may be varied in order to substantially match the emitting region of a display to be tested. In other embodiments, the testing surface 114 may be larger than a testing display emitting region, and may be used to test various sized displays. In yet other embodiments, the testing surface 114 may be smaller than the emitting region of a display and may be configured to only capture data regarding select areas of an emitting region of a display.

One or more sensors 120 may be operably connected to the testing surface 114. The sensors 120 may be dispersed across the testing surface 114. The sensors 120 are configured to detect light emitted from a portion of a display received within the receiving cavity 110. For example, the sensors may be photosensors or phototransistors that may produce a signal in response to light. In some embodiments, each of the plurality of sensors 120 may include a luminosity curve generally peaking at a wavelength in the electromagnetic spectrum visually perceptible to humans (e.g., having a wavelength ranging from about 390 to 750 nanometers). In other words, the sensor 120 may be responsive or register an input within a spectral range that may be approximately the same range of wavelengths as is detectable by the human eye. In these embodiments, the sensors 120 may be better able to detect non-uniformities of the display that may be detectable by a human user, without substantially detecting non-uniformities that may not be visible to a human user. One example of a sensor 120 that has been found suitable for this purpose is the Agilent model APDS-9002 phototransistor sensor. However, many other sensor types are envisioned, and the type of sensor and its spectral response may be varied depending on the desired use for a display. The operation of the testing device 100 and sensors 120 will be discussed in more detail below with respect to FIGS. 10 and 11.

The resolution and/or sensitivity of the testing device 100 may be varied by varying the sensors 120. For example, the resolution may be varied depending on the physical size of the sensors 120, as well as the placement of the sensors 120. Specifically, the smaller the sensors 120 and the closer together the sensors 120 may be to each other, the higher the resolution and the sensitivity of the testing device 100. However, in some instances, the sensors 120 may be affected by increases in temperature, and each sensor 120 may also produce heat while operating. In these instances, the sensors 120 may be positioned a spacing distance apart from one another, such that each sensors 120 may have a reduced chance of being effected by any heat emitted by adjacent sensors. In these instances, the spacing distance may be selected by taking into account the desired resolution of the testing device 100, as well as heat produced by a particular type of sensor.

In some embodiments, the sensors 120 may be positioned across substantially the entire testing surface 114. In other embodiments, such as the embodiment shown in FIG. 4, the sensors 120 may be arranged into one or more sensing groups 116, 118. The sensing groups 116, 118 may be positioned to capture data from one or more emitting regions of the display (when positioned on top of the testing surface 114). The sensing groups 116, 118 may be positioned based on the desired non-uniformities to be detected by the testing device 100. For example, the testing device 100 may include sensors 120 positioned around a perimeter of the testing surface 114 to best detect light leakage. In other words, the testing device 100 may have a reduced number of sensors to reduce power consumption and expense by selecting the position of groups of sensors 120 to best detect specific non-uniformities.

In some embodiments, a first sensing group 116 may include sensors 120 positioned around a perimeter of the testing surface 114. This first sensing group 116 may include one or more rows 124 of sensors 120 that may extend a distance D1 towards a center of the testing surface 114. The number of sensor rows 124 may be determined based on the desired areas of the display that may be desired to be tested. For example, in some instances it may be desirable to test only for light leakage at an edge of the emitting region of a display and so only a single row of sensors 120 may be desired. In other instances, more areas of the emitting region of the display may be tested and therefore the rows 124 may extend further inwards than the distance D1 shown in FIG. 4.

The second group of sensors 118 may be positioned in one more rows 126 around a center point of the testing surface 114. In this embodiment, the second group of sensors 118 may be configured to capture data from a center area of a tested display. In some embodiments, the two sensor groups 116, 118 may cooperate to capture data corresponding to one or more non-uniformities of a tested display.

With continued reference to FIG. 4, the receiving cavity 110 may be configured so that a portion of or the entire display to be tested by the testing device 100 may be received therein. The receiving cavity 110 may be at least partially surrounded by one or more walls 122 that may extend from a bottom surface 130. It should be noted that in some embodiments, the testing surface 114 may be supported on the bottom surface 130 either in a recessed manner so that a top surface of the testing surface 114 may be substantially even with the top of the bottom surface 130. In other embodiments, the testing surface 114 may be positioned either above or below the bottom surface 130 of the bottom 104.

In addition to the receiving cavity 110, one or more access apertures 132 may be defined within the bottom portion 104. For example, two access apertures 132 may be formed on opposite sides of the testing surface 114. The access apertures 132 may provide space between the walls 122 and a display to remove or place a display into the receiving cavity 110. For example, the receiving cavity 110 may be rectangular shaped that may substantially match the shape of the display. In these embodiments, the walls 122 may substantially surround the display when received within the receiving cavity 110 and thus the display may be difficult to pick up or move from either the receiving cavity 110. The access apertures 132 may expand the walls 122 in a select location to assist a use to moving the display while the display is within the receiving cavity 110.

One or more enclosure recesses 134 may also be defined within the bottom 104 of the testing device 100. The enclosure recesses 134 may be configured to receive components that may be operably connected to a display to be tested. For example, the enclosure recesses 134 may be configured to receive a power cord, a base for supporting the display, or the like. Additionally, the bottom 102 may also define one or more input apertures 136 that may provide access for a communication and/or power cord to the display through the testing device 100. For example, in some embodiments, a display to be tested may require a wired power source or may require a hardwire connection to a computing or other processing device in order to display one or more images on the screen during testing. In these examples, the power and/or communication cord may be inserted through the input apertures 136 to connect to the display while received within the testing device 100.

Figure 5:
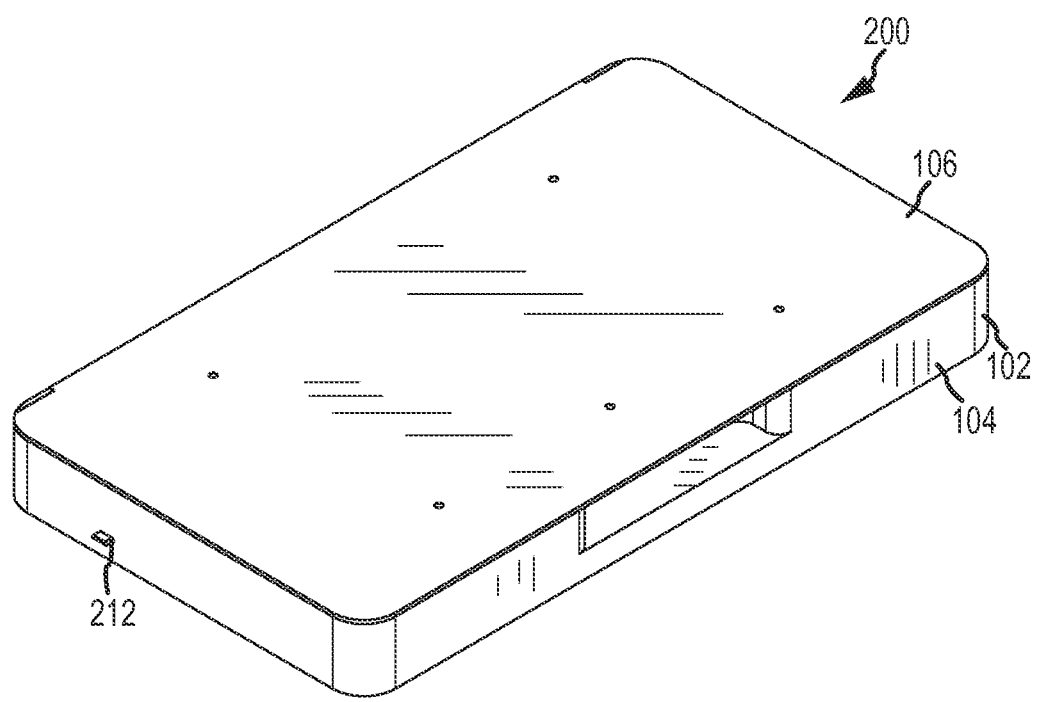
FIG. 5 is a top perspective view of another sample embodiment of the testing device.
Figure 6A:
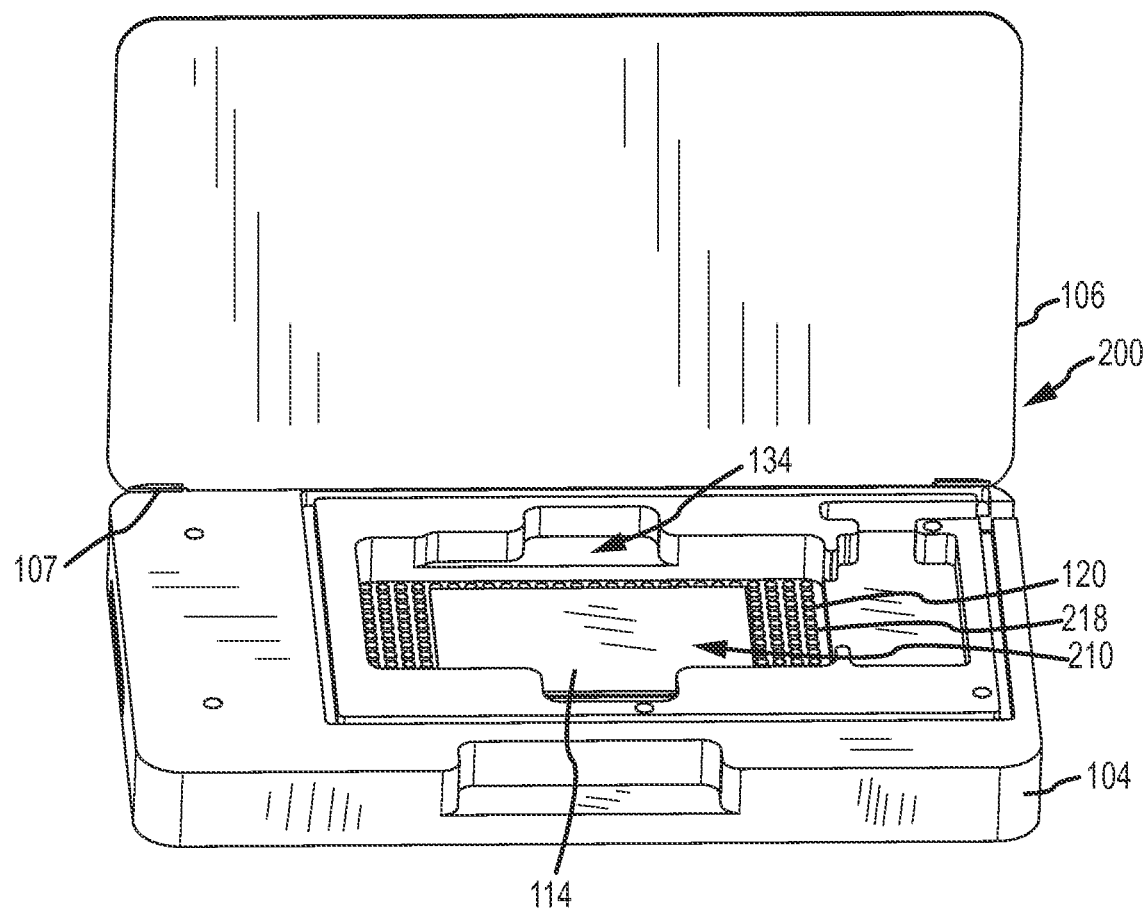
FIG. 6A is a front top perspective view of the testing device of FIG. 5 with a cover in the open position.
Figure 6B:
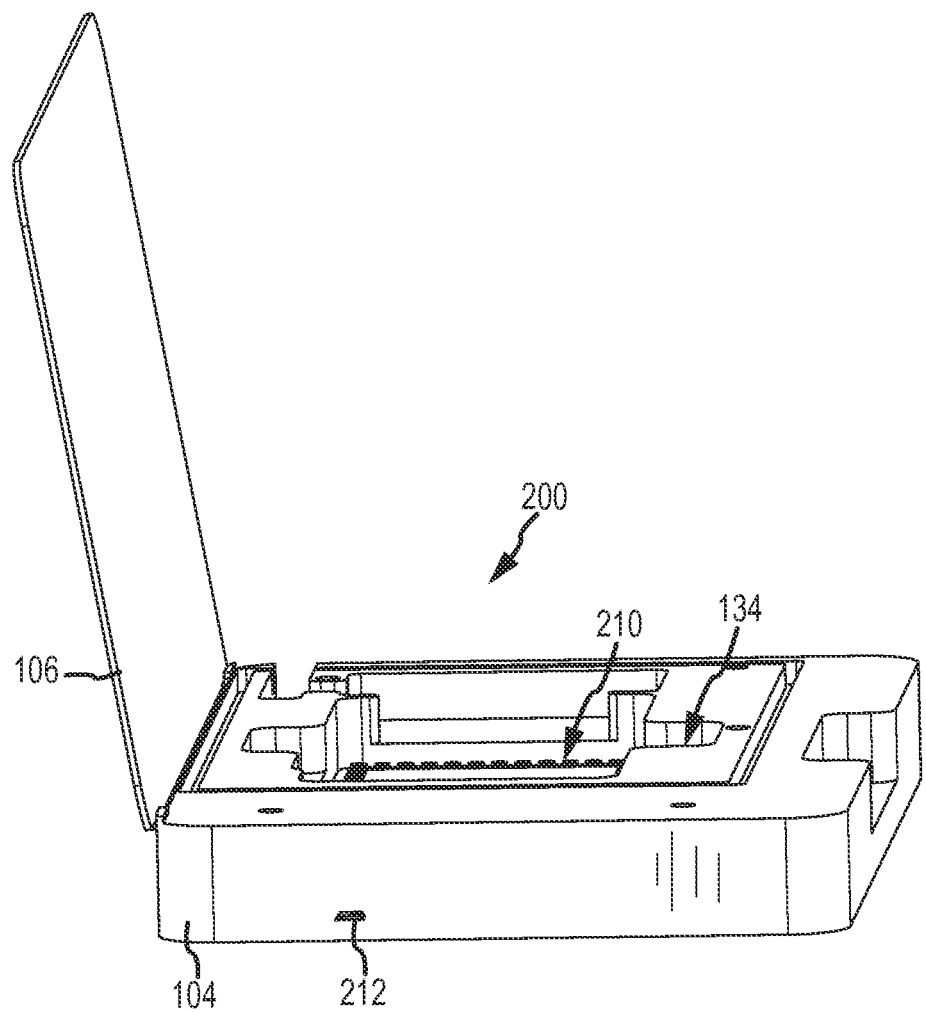
FIG. 6B is a side perspective view of the testing device of FIG. 5 with the cover in the open position.
Figure 7:
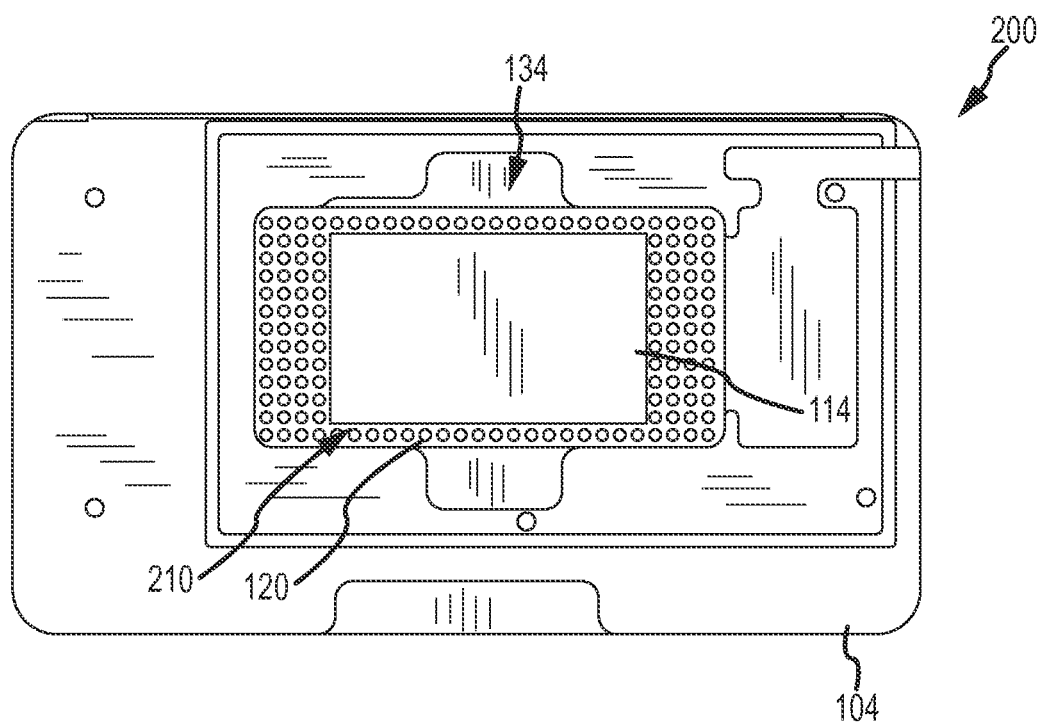
FIG. 7 is a top plan view of a bottom of the testing device of FIG. 5.

As briefly discussed above, the testing device 100 may be configured to accommodate various display sizes. FIG. 5 is a top perspective view of a testing device 200 configured to receive a smaller display than the testing device 100 of FIG. 1. FIG. 6A is a top perspective view of the testing device 200 with a cover in an open position. FIG. 6B is a side perspective view of the testing device 200 with the cover in an open position. FIG. 7 is a top plan view of the testing device 200. It should be noted that for elements or features not specifically described, those features may be substantially the same as the testing device 100 illustrated in FIG. 1. For example, the testing device 100 of FIG. 1 may be configured to receive a tablet computing device, such as an iPAD by Apple, Inc., whereas the testing device 200 of FIGS. 6A-7 may be configured to receive a smartphone, such as an iPHONE by Apple, Inc. Of course, the testing devices 100, 200 may be configured to receive many other types of displays, including those that are integral and separate from a computing device.

The testing device 200 may be configured to receive a display that may be smaller in size than the testing device 100 or its cavity. For example, the testing device 200 may be configured to receive a mobile electronic device including a display, such as a smart phone, digital music player, or portable gaming device. The receiving cavity 210 defined within the main body 102 of the testing device 200 may be smaller than the receiving cavity 110 to accommodate for the change in size of the testing display. In some instances it may be desirable to have the receiving cavity 210 be substantially the same size as the display to help reduce light that may leak around the edges between the walls 122 and the testing display that could affect data collected by the sensors 120.

With reference to FIG. 6B, the testing device 200 may also include an input port 212 that may receive one or more communication cables. As discussed above with respect to the testing device 100, the testing device 200 may transfer sensor data to one or more external electronic or computing devices. Also, the testing device 200 may receive power from one or more sources, such a wired power or wireless power source. As shown in FIG. 6B, a data and/or power cord may be inserted therein and may be placed in communication with the sensors 120 (either directly or through one or more other element such as a processor or the like).

With reference to FIG. 7, the testing device 200 may include only a single group of sensors 218. As the display may be smaller, the amount of sensors 120 which may be required to capture data from the display may be reduced. Additionally, the rows 224 of sensors 120 may be reduced along one or more sides of the testing surface. For example, along two of lateral sides of the testing surface 114, the testing device 200 may include a single row 224 of sensors 120.

Inserting a display into the testing device 100 will now be discussed in more detail. FIG. 8A is a perspective view of an electronic device 300 being inserted into the testing device 100. FIG. 8B is a side elevation view of the electronic device 300 received within the testing device 100. The electronic device 300 may be a smart phone, a digital music player, a display screen for a monitor, a laptop, a tablet computer, and so on. Although substantially any type of electronic display may be received within the testing device 100, in some instances, the display may be part of a mobile electronic device 300. For example, the mobile electronic device 300 may include a display 302 and an enclosure 304 received around the display 302. The display 302 may be in communication with one or more components enclosed within the electronic device 300, such as a processor, memory, networking mechanisms, and so on. The display 302 may be configured to emit light wavelengths in order to display one or more images or other visual outputs. For example, the display 302 may be a LCD, LED, or plasma screen that may emit light in response to one or more electrical signals.

The electronic device 300 may be positioned within the receiving cavity 110 so that the display 302 may face the sensors 120. In some embodiments, the enclosure 304 of the electronic device 300 may be substantially aligned with the walls 122 defining the receiving cavity 110 such that there may be little or no space between the enclosure 304 and the walls 122. In this position, external light or light otherwise not emitted by the display 302 may be substantially prevented from contacting the sensors 120. Once the electronic device 300 is positioned within the receiving cavity 110, the cover 106 may be closed to further reduce the chance that light other than light emitted by the display 302 may reach the sensors 120.

It should be noted that the display 302 may be positioned in optical communication with the one or more sensors 120 in various other manners as well. For example, the testing device 100 and/or testing surface 114 may be snap-fit to the display 302 or the electronic device 300, or the display 302 may be placed on top of the testing surface 114 but not received within a cavity or other recess.

Once inside the receiving cavity 301, light emitted from the display 302 may be registered or captured by the sensors 102. FIG. 9 is a cross-sectional view of the electronic device 300 received within the receiving cavity 310. As shown in FIG. 9, the display 302 may be positioned on top or adjacent to the sensors 120. In this manner, as light is emitted from the display 302 it may encounter one or more sensors 120. In some embodiments, the sensors 120 may be configured to register or otherwise capture light wavelengths that may be substantially similar to the light wavelengths of a human eye. Thus, light emitted within the light spectrum that may be perceptible to humans may be captured by the sensors 120.

As light encounters the sensors 120, each sensor 120 may produce a signal that may correspond to the brightness or luminance, color, intensity, or the like of the emitted light. In this manner, the groups of sensors 118, 120 may create a two-dimensional (2D) image of light emitted from the display 102. This 2D image may be evaluated to determine if the display 302 has one or more non-uniformities. As will be discussed, the sensors 120 may capture light emitted from the display 302 over a time period, which may allow the sensors 120 to create multiple images and/or signals of the display 302 as it emits light over a period of time.

Figure 10:
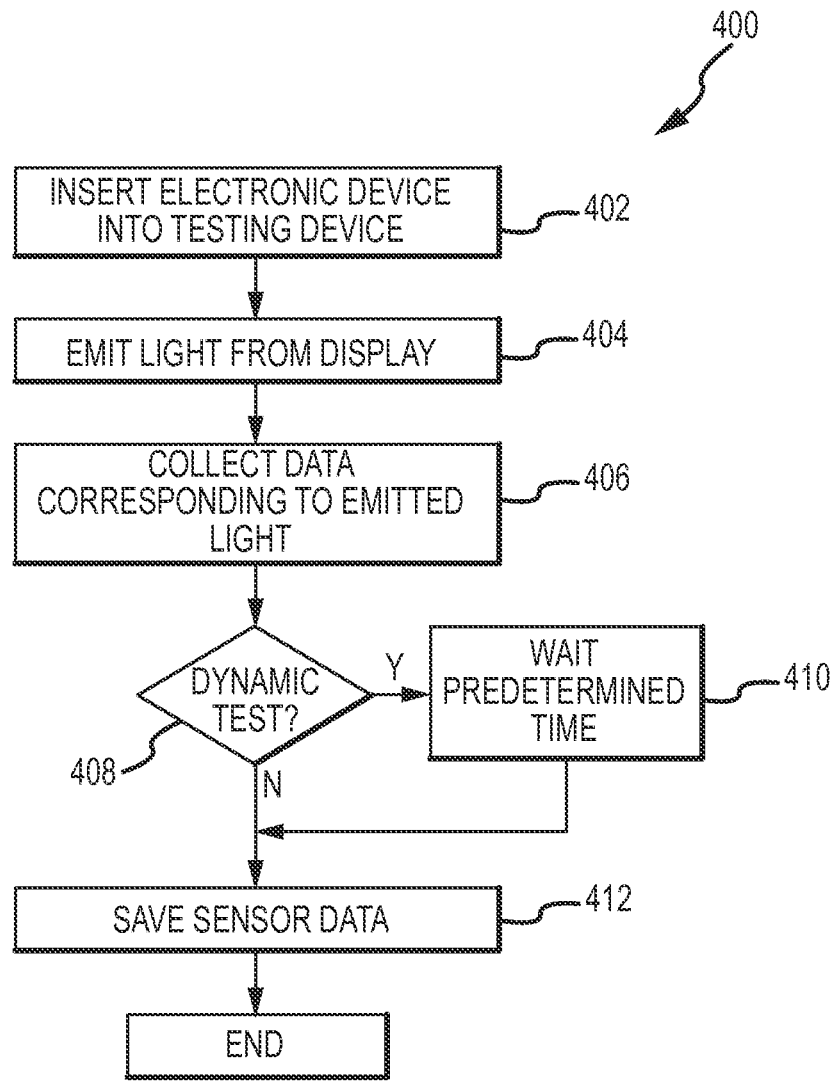
FIG. 10 is a flow chart illustrating a method for testing the electronic display in order to detect one or more non-uniformities.

A method for using the testing device 100 will now be discussed in more detail. FIG. 10 is a flow chart illustrating a method 400 for testing the display 302 for one or more non-uniformities. The method 400 may begin with operation 402, in which the display 302 may be inserted into the receiving cavity 110 of the testing device 100. In instances where the display 302 is a separate component from the electronic device (such as a desktop monitor), the display 302 alone may be inserted into the receiving cavity 110. In other embodiments, the testing device 100 may be snap-fit onto the display 302, the display 302 may be positioned on top of the testing surface 114 directly (e.g., the testing device may be relatively planar), or the testing device 100 may be slid onto the display 302 (e.g., through a slot in the body of the testing device). However, when the display 302 is part of a mobile or other electronic computing device 300, such as shown in FIG. 8A, the display 302 and at least a portion of the electronic device 300 may be received into the receiving cavity 110. It should also be noted that in some embodiments, only a portion of the display 302 may be inserted into the receiving cavity 110.

With reference to FIG. 9, the display 302 may be positioned within the receiving cavity 110 so as to face the sensors 120. In other words, the light emitting area of the display may be positioned in optical communication with the one or more sensors 120. Once the display 302 is positioned within the receiving cavity 110, the cover 106 may be closed in order to substantially prevent light from outside of the testing device 100 from leaking into the receiving cavity 110 and/or encountering the sensors 120.

After operation 402, the method 400 may proceed to operation 404 and light may be emitted from the display 302. In operation 404, the display 302 may emit one or more images or otherwise provide visual output. For example, the electronic device 300 may include a processor that may provide electronic signals to LCD, LED, or other electronic display to cause the display 302 to emit light. The light emitted by the display 302 may be selected to have a predetermined pattern that may best illustrate (when captured by the sensors 120) any non-uniformities that may be present in the display 302. For example, the display 302 may emit light of a single color across the entire display 302 or may emit different colors of light in a known pattern, or the like.

While the display 302 is emitting light, the method 400 may proceed to operation 406 and the sensors 120 may collect data corresponding to the emitted light from the display 302. As discussed above, the sensors 120 may be phototransistors that may produce a signal that may correspond to light wavelengths that encounter the sensors 120. Additionally, in some embodiments, the sensors 120 may be configured to have a responsiveness that may at least partially match the human responsivity spectral curve. In this manner, the sensors 120 may collect data of the emitted light that may correspond to a visual output response that may be perceptible by humans.

While the sensors 120 are collecting data corresponding to the light from the display 302, the method 400 may proceed to operation 408. In operation 408, it may be determined (either by a computer or user) whether the testing device 100 should test the display 302 for dynamic artifacts. For example, in some instances, the display 302 may be used to emit single instances of light and may not be operated over time and as such any dynamic non-uniformities may not affect the overall desired performance for the display. If the testing device 100 is to test the display 302 for dynamic artifacts, the method 400 may proceed to operation 410 and the display 302 may emit light for a predetermined time period while the sensors 120 may continue to collect data over the time period. As described above, dynamic artifacts may be non-uniformities that may be not appear at discrete time instances, but appear as a non-uniformity over time. For example, a dynamic artifact may be a flicker in an image output by the display 302 or a ripple through the image of the display 302. However, the ripple may only be apparent if the sensors 120 monitor the display 302 over the time period in order to detect a change in emitted light between before the ripple and during the ripple. As such, if the emitted light of the display 302 is not evaluated over a time period, these non-uniformities may go undetected, as they light may be evaluated at the first time instance when the image may be substantially uniform. Hence, in operation 410, the sensors 120 may capture data corresponding to light emitted from the display 302 over a predetermined time period.

The time period of operation 410 may be determined based on the desired dynamic artifacts for which the display 302 is to be tested. For example, some dynamic artifacts may have a longer time cycle during which a non-uniformity may be present and other dynamic artifacts may have a shorter time cycle. For example, some dynamic artifacts may be present every 3 ms whereas other dynamic artifacts may be present only every 5 ms.

After either operation 408 or after operation 410, the method may proceed to operation 412 and the data collected by the sensors 120 may be stored. In some instances, the testing device 100 may transfer the data through one or more communication cables 112, wirelessly, or the like to a memory element. In other instances, the testing device 100 itself may include an internal memory element to store the sensor data directly. In some embodiments, operation 412 may be optional and data collected by the sensors 120 may be presented substantially as it is collected. For example, the output mechanism 108 may output a form of the data while it is collected. However, it should be noted that in some instances operation 410 may be omitted. For example, the sensor data may not be stored, but only may be analyzed and the results may be displayed or otherwise output.

Figure 11:
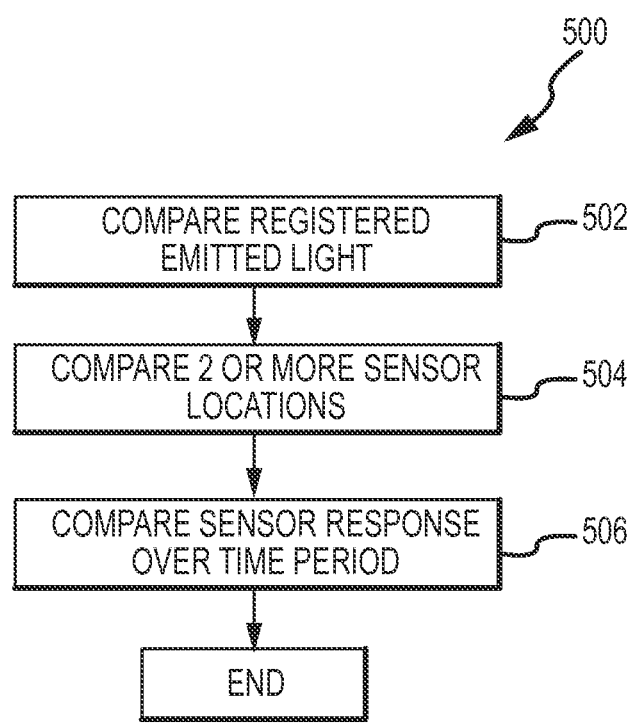
FIG. 11 is a flow chart illustrating a method for analyzing sensor data in order to determine if a tested electronic display has one more non-uniformities.

After method 400 and data corresponding to light emitted from the display 302 may be analyzed in order to determine if the display 302 includes one or more non-uniformities. FIG. 11 is a flow chart illustrating a method 500 for analyzing the sensor 120 data to determine if the display 302 has one or more non-uniformities. In some embodiments, the testing device 100 may include a processor or other element capable of receiving data and processing instructions. In these instances, the method 500 may be performed by the testing device 100. In other examples, a portion of the method 500 or the method 500 may be performed by one or more external computing devices, even the electronic device 300 including the display 302 may perform one or more steps of the method. It should also be noted that the operations of the method 500 may be completed in substantially any order and one or more operations may be omitted or performed separately from the other operations.

The method 500 may begin with operation 502. In operation 502 the sensor 120 data may be compared with the expected emitted light to determine if the light emitted by the display 302 corresponds to the light expected to be emitted from the display 302. In other examples, the sensor 120 data may be compared against a relative value of a particular sensor 120 or group of sensors 120 over time or as compared against the data from substantially similar displays. In this manner, the method 500 may detect one or more non-uniformities in the display 302. For example, the display 302 may be configured to emit an image having a certain color and luminance, but due to n non-uniformity, the color and/or luminance actually emitted by the display 302 may differ.

After operation 502, the method 500 may proceed to operation 504 and the data collected from the two sensor groups 116, 118 or two or more sensors 120 in spatially separated locations may be compared In some embodiments, the display 302 may be configured to emit a uniform light across its entire area, but in reality one or more non-uniformities may cause the emitted light to be varied spatially across the area of the display 302. For example, if the display 302 has light leakage at a perimeter of the display 302 adjacent the enclosure 304, the sensors 120 detecting light at the perimeter of the display 302 may have a higher luminance signal than sensors 120 (such as those in the second group 118).

As another example, the testing device 100 may detect a non-uniformity such as a hot spot in the display 302. In this example, sensors 120 detecting light emitted near or at the pixel defect causing the hot spot may produce a lower signal than sensors 120 detecting light from other areas of the display 302. Accordingly, in embodiments where the testing device 100 may have fewer sensors 120 than the display 302 has pixels, defects in a single pixel or group of pixels may still be detected. This is because a sensor 120 capturing light from a group of pixels with a single or small group of defective pixels may register a lower amount of light as compared with a sensor 120 that registers light from a same size group of functioning pixels.

In operation 504, the data from two or more sensors 120 may be compared at discrete time instances, as well as over a predetermined time period. In this manner dynamic artifacts, such as ripple, may be detected. For example, dynamic artifacts may create a non-uniformity along a portion of the display 302 that may vary during a time period. Further, in some instances, a dynamic artifact may not be apparent except by comparing a first display location as captured by a sensor to a second display location as compared by a second, spatially separated, sensor.

After operation 504, the method 500 may proceed to operation 506 and a sensor 120 or group of sensors 116, 118 may be compared over a time period. As discussed with respect to operation 410 in method 400, by testing the display 302 over a predetermined time period, the sensors 120 may be able to detect one or more dynamic artifacts or other temporal non-uniformities of the display 302. Some typical display testing systems may capture an image of the display in order to analyze the optical characteristics of the display. However, the captured images may not disclose dynamic artifices. For example, flickering of a display may only be apparent if the image is captured at the exact moment where screen flickers, and if not then the display may appear to be substantially uniformity. On the contrary, the sensors 120 of the testing device 100 may capture data from the display 302 for a predetermined time period, which may be chosen to allow for sufficient time to capture any dynamic artifacts, if present.

Conclusion

The foregoing description has broad application. For example, while examples disclosed herein may give examples of a single display testing device, it should be appreciated that the concepts disclosed herein may equally apply to testing device that may test multiple displays as a time. Similarly, the types of displays tested may also vary. Accordingly, the discussion of any embodiment is meant only to be an example and is not intended to suggest that the scope of the disclosure, including the claims, is limited to any examples set forth herein.

We claim:

1. A device for testing one or more characteristics of an electronic display comprising:
   a main body;
   a receiving cavity defined within the main body and configured to receive the electronic display, wherein the receiving cavity is defined by a first surface surrounded by a plurality of sidewalls, wherein the sidewalls define a rectangular shape that substantially matches the shape of the electronic display, wherein the sidewalls have a top surface, and wherein the electronic display is contained entirely below the top surface of the sidewalls when in the receiving cavity;
   a plurality of sensors positioned on the first surface and configured to be in optical communication with the electronic display received within the receiving cavity, wherein the plurality of sensors is configured to detect at least one type of non-uniformity of the electronic display;
   a cover that prevents light from entering the receiving cavity; and
   an output mechanism on the cover, wherein the output mechanism comprises a grid of lights, wherein each light has a location that corresponds to a location of a respective sensor on the first surface of the receiving cavity.

2. The device of claim 1, wherein the plurality of sensors are positioned to capture a perimeter of a light emitting area to a portion inwards towards a center of the light emitting area, but terminate prior to the center of the light emitting area.

3. The device of claim 1, wherein the output mechanism is in communication with the plurality of sensors and configured to provide at least one indication corresponding to the non-uniformity.

4. The device defined in claim 1, wherein the device has an aperture formed on the first surface.

5. The device of claim 1, wherein the at least one non-uniformity includes at least one optical characteristic and at least one artifact.

6. The device of claim 1, wherein the plurality of sensors are photo sensors.

7. The device of claim 5, wherein the at least one artifact includes at least one static artifact and at least one dynamic artifact.

8. The device of claim 6, wherein the plurality of sensors are phototransistors that have a peak that substantially follows a human luminosity curve.

9. A method for detecting one or more non-uniformities in an electronic display comprising:
   providing a testing device having one or more sensors, wherein the testing device has an interior and an exterior;
   collecting, by the one or more sensors, light data corresponding to light emitted from the electronic display over a time period, wherein the one more sensors are on the interior of the testing device; and
   with an output mechanism on the exterior of the testing device, displaying the light data as it is collected.

10. The method of claim 9, wherein the one or more sensors are phototransistors.

11. The method of claim 9, further comprising: comparing the light data to a light desired to be emitted by the electronic display to determine if the emitted light is substantially equal desired light to be emitted.

12. The method of claim 9, further comprising comparing by a processor light data collected by a first sensor at a first location to light data collected by a second sensor at a second location.

13. The method of claim 9, further comprising comparing by a processor light data emitted by one of the one or more sensors over the time period.

14. A testing apparatus for detecting two or more characteristics of a display for a computing device comprising:
   a main body;
   a receiving cavity defined within the main body and configured to receive at least a portion of the display;
   a first group of sensors positioned on a first surface and configured to be in optical communication with a first portion of the display received within the receiving cavity; and
   a second group of sensors positioned on the first surface and spatially separated from the first group of sensors by a portion of the first surface, the second group of sensors configured to be in optical communication with a second portion of the display received within the cavity, wherein the portion of the first surface is free of sensors, wherein the first and second group of sensors are configured to detect at least one type of non-uniformity of the display, wherein the first group of sensors and the second group of sensors are phototransistors, wherein the first group of sensors and the second group of sensors create a two-dimensional image of light emitted from the display.

15. The testing apparatus of claim 14, wherein the first portion of the display is a perimeter of a light emitting region of the display, and the first group of sensors is configured to detect light leakage.

16. The testing apparatus of claim 14, wherein the second portion of the display is a center of the display.

17. The testing apparatus of claim 14, wherein the first group of sensors and the second group of sensors have a responsiveness that at least in part matches the human responsivity spectral curve.

18. The testing apparatus of claim 14, wherein the first group of sensors and the second group of sensors are both in electrical communication with a processor.

19. The testing apparatus of claim 18, wherein the processor is separate from the testing device.

\* \* \* \* \*